United States Patent [19]
Autechaud et al.

[11] Patent Number: 5,644,716
[45] Date of Patent: Jul. 1, 1997

[54] SHARED MEMORY INFORMATION PROCESSING SYSTEM WITH INTERNODE CONNECTIONS ENABLING IMPROVED PERFORMANCE WITH ADDED PROCESSOR NODES

[75] Inventors: Jean-François Autechaud, Paris; Ghassan Chehaibar, Les Clayes Sous Bois, both of France

[73] Assignee: Bull S.A., Puteaux, France

[21] Appl. No.: 275,377

[22] Filed: Jul. 15, 1994

[30] Foreign Application Priority Data

Jul. 15, 1993 [FR] France .................................. 93 08710

[51] Int. Cl.⁶ .................................................. G06F 13/00
[52] U.S. Cl. ...................... 395/200.08; 395/840; 395/800
[58] Field of Search ........................ 395/200.01, 200.02, 395/200.03, 200.06, 200.07, 200.08, 200.1, 200.2, 200.21, 825, 828, 882, 840, 281, 287, 308, 475, 479, 480, 182.02, 650, 800; 364/131, 133, 134

[56] References Cited

U.S. PATENT DOCUMENTS

| | | | |
|---|---|---|---|
| 4,445,174 | 4/1984 | Fletcher | 395/448 |
| 4,755,930 | 7/1988 | Wilson, Jr. et al. | 395/449 |
| 5,136,500 | 8/1992 | Lemay et al. | 395/250 |
| 5,140,681 | 8/1992 | Uchiyama et al. | 395/461 |
| 5,165,018 | 11/1992 | Simor | 395/200.1 |
| 5,226,144 | 7/1993 | Moriwaki et al. | 395/448 |
| 5,228,136 | 7/1993 | Shimizu et al. | 395/468 |
| 5,241,641 | 8/1993 | Iwasa et al. | 395/449 |
| 5,241,664 | 8/1993 | Ohba et al. | 395/448 |
| 5,291,442 | 3/1994 | Emma et al. | 395/447 |
| 5,303,362 | 4/1994 | Butts, Jr. et al. | 395/448 |

FOREIGN PATENT DOCUMENTS

| | | |
|---|---|---|
| 0388032 | 2/1990 | European Pat. Off. . |
| 0434250 | 11/1990 | European Pat. Off. . |
| 218532 | 8/1984 | Japan . |
| 144154 | 6/1989 | Japan . |

Primary Examiner—Alpesh M. Shah
Attorney, Agent, or Firm—Kerkam, Stowell, Kondracki & Clarke, P.C.; Edward J. Kondracki

[57] ABSTRACT

An information processing system includes processors grouped in nodes (1) associated with one another by links (4) in a variable number of nodes up to the maximum configuration, which is divided into subsets (3) having a critical size relative to a rate of messages between nodes, the nodes in one subset being connected to one another by double serial links, and the nodes of two adjacent subsets being connected by single serial links, the nodes preferably being grouped in two supernodes including two subsets (3).

22 Claims, 6 Drawing Sheets

SHARED MEMORY INFORMATION PROCESSING SYSTEM WITH INTERNODE CONNECTIONS ENABLING IMPROVED PERFORMANCE WITH ADDED PROCESSOR NODES

CROSS-REFERENCE TO RELATED APPLICATIONS

This application is related to U.S. application Ser. No. 08/275,384, (Bull 3412), now abandoned, in the name of BILLARD et al., and entitled "PROCESSOR NODE", which application is filed concurrently herewith and claims priority from French Application No. 93 08712. Said application is assigned to the assignee of the subject application. This application is also related to U.S. application Ser. No. 08/275,383, (Bull 3414), now U.S. Pat. No. 5,568,633, in the name of LESMANNE et al., and entitled "PROCESS FOR COHERENT MANAGEMENT OF EXCHANGES BETWEEN LEVELS OF A HIERARCHY OF MEMORIES WITH AT LEAST THREE LEVELS", which application is filed concurrently herewith and claims priority from French Application No. 93 08711. Said application is assigned to the assignee of the subject application. The subject matter of the foregoing U.S. applications (Bull 3412 and 3414) is incorporated herein by reference.

FIELD OF THE INVENTION

The present invention relates to an information processing system with shared memory.

BACKGROUND OF THE INVENTION

Information processing systems with shared memory, including processors grouped in nodes associated with one another by links, are known. One of the main problems of systems of this type is the nonlinearity in performance of the information processing system as a function of the number of processors. The number of messages exchanged between the processors and the various parts of the memory in fact increases more rapidly than the number of processors, the more the sharing of the memory among the various processors requires the use of coherence messages, whose number increases very rapidly when the number of processors is increased. Certainly, increasing the number of links to enable a higher overall message rate has been contemplated. Nevertheless, increasing the number of links very rapidly increases the cost of the system and also increases the complexity of the coherence protocols in order to prevent two contradictory messages from circulating on two separate links simultaneously.

SUMMARY OF THE INVENTION

One object of the invention is to propose an information processing system having a structure making it possible to improve the proportionality in performance of the system in proportion to the number of processors.

With a view to attaining this object, the invention proposes an information processing system with shared memory, in which the maximum configuration is divided into subsets that have a critical size relative to a rate of messages between nodes, the nodes of one subset being connected to one another by double serial links, and the nodes of two adjacent subsets being connected by single serial links.

Hence for a configuration less than the maximum configuration, and in particular for a configuration including a number of nodes less than the critical size, that is, a number of nodes for which the message rates threaten to be very poorly distributed over the various links, this risk of poor distribution is compensated for by doubling the links. Conversely, for a configuration greater than the critical size, that is, a configuration for which the number of nodes is sufficiently high that one can hope for statistically homogeneous distribution of the message rates at least within acceptable proportions, the cost of the system is minimized while assuring a single link between the subsets. On the other hand, doubling the links in the subsets makes it possible to guarantee continuity of operation of each subset, even in the case when a link is out of service, which is especially important if the information processing system has a configuration limited to one subset.

In an advantageous version of the invention, the maximum configuration is divided into supernodes each including two subsets, the supernodes being connected in pairs by double serial links associating each node of a supernode with a corresponding node of another supernode. It has been confirmed that the message rate between adjacent nodes is thus valuable increased, without necessarily increasing the complexity of the coherence protocols.

In another advantageous aspect of the invention, a pair of associated supernodes is connected to another pair of associated supernodes by single serial links connecting each node of a pair with two corresponding nodes of the other pair. Thus without increasing the complexity of the coherence protocols, a link between nodes is assured such that the communication between two nodes requires at most the use of two successive links, regardless of the relative position of the two nodes communicating with one another.

In another advantageous aspect of the invention each node includes at least one local bus assuring a parallel link between the processors, a local memory and a shared cache, and a network bus assuring a parallel link between the local memory, the shared cache, and at least one serial link controller, Thus in each node the rate of messages circulating on each parallel bus is minimized, since the local bus carries only the messages that assure a relationship between the processors on the one hand and the shared cache and the local memory on the other, while the network bus carries only the messages that assure a relationship between the shared cache and the local memory on the one hand and the other nodes on the other. While minimizing the message rate, it will be noted that this arrangement nevertheless enables simultaneous access to the local memory and to the shared cache, by way of either the local bus or the network bus.

BRIEF DESCRIPTION OF THE DRAWINGS

Further characteristics and advantages of the invention will become more apparent from the ensuing description of a particular non-limiting embodiment of the system according to the invention, in conjunction with the drawings, in which.

DETAILED DESCRIPTION OF THE DRAWINGS AND THE PREFERRED EMBODIMENTS

Figure 1:
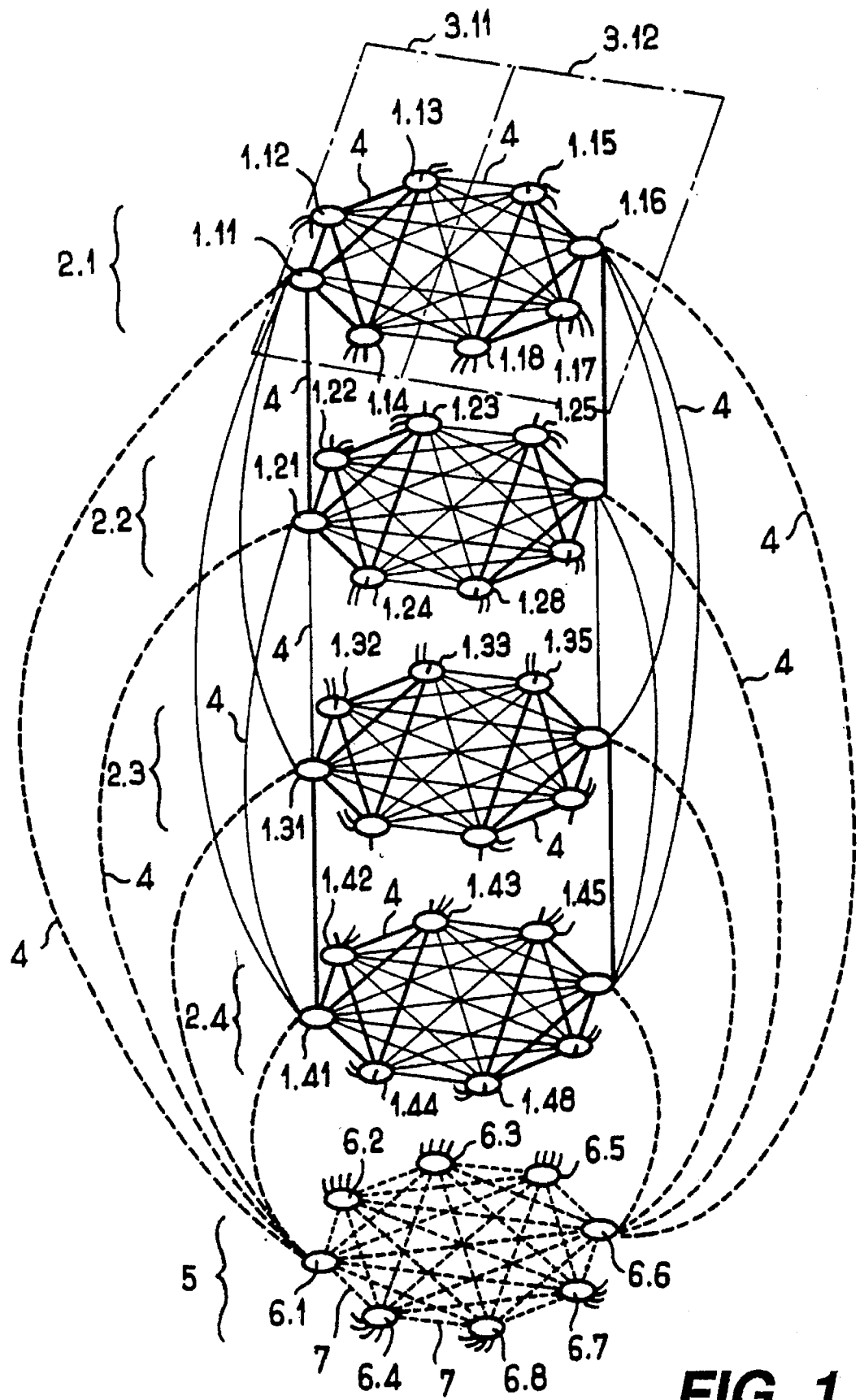
FIG. 1 is a schematic diagram illustrating the general structure of the information processing system according to the invention.
Figure 2:
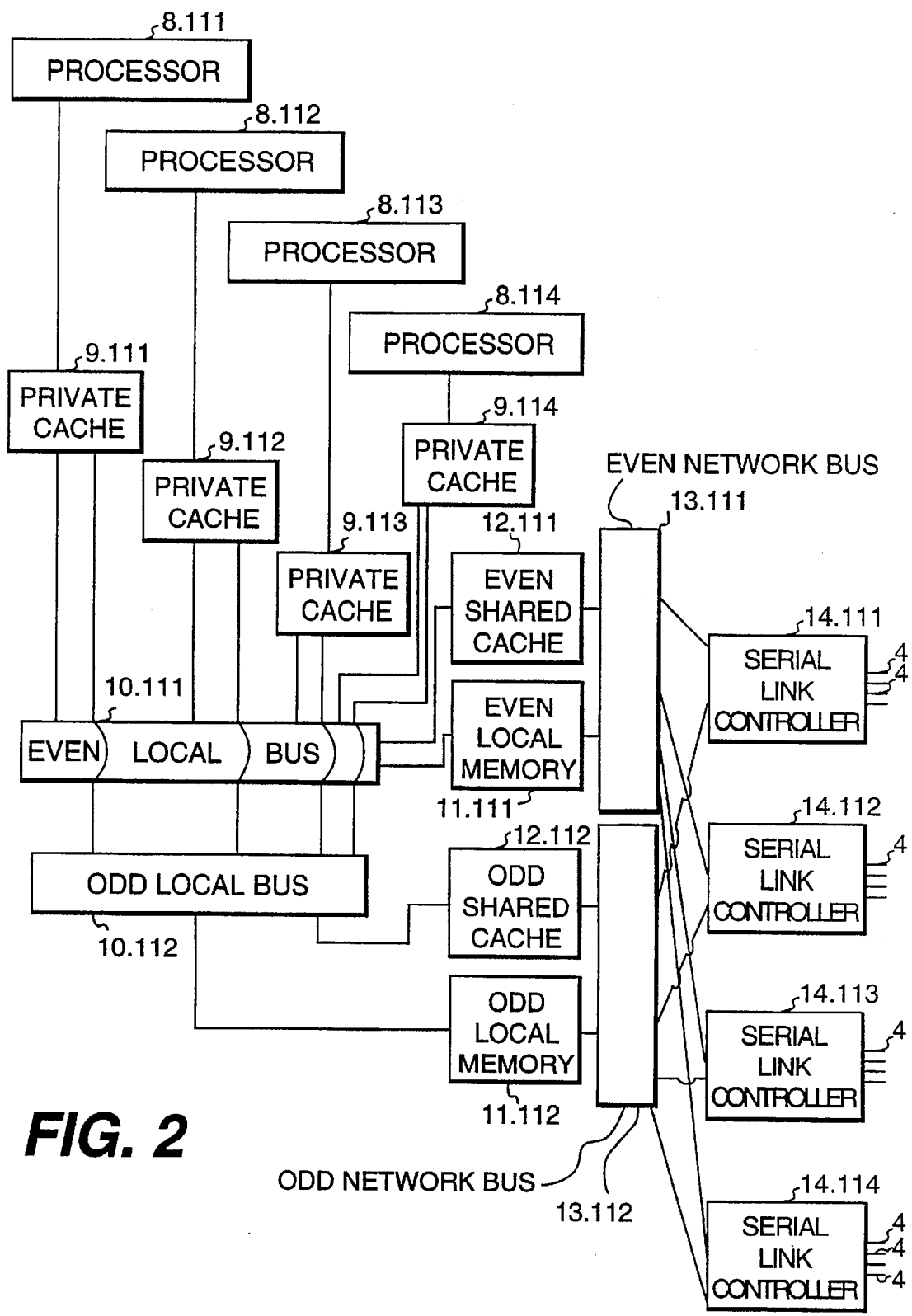
FIG. 2 is a schematic diagram illustrating the structure of a node in an embodiment of the invention; node FIG. 2.

Turning to FIG. 1, the information processing system according to the invention is a shared memory system, that is, a system in which the general memory to which all the processors must be capable of having access is distributed among local memories, to which each of the processors may have direct or indirect access, the processors themselves being grouped in nodes associated with one another by links. In FIG. 2, the processor nodes are identified by the general reference numeral 1, and in an aspect of the invention the set of nodes 1 is divided among supernodes having the general reference number 2. The set shown includes four supernodes 2 each including eight nodes 1. To enable particular identification of the nodes and supernodes, the general reference numeral is associated with a particular reference numeral. Accordingly, the first supernode has the complete reference numeral 2.1; the second supernode has the complete reference numeral 2.2; the third supernode has the complete reference numeral 2.3; and the fourth supernode has the complete reference numeral 2.4. In each supernode 2, each node 1 has a particular reference numeral identifying it on the one hand in terms of the supernode to which it belongs (the first digit in the particular reference numeral), and on the other by its ordinal number in the supernode (the second digit of the particular reference numeral). Hence the first node of the first supernode has the complete reference numeral 1.11; the second node of the first supernode has the complete reference numeral 1.12; and the third node of the first supernode has the complete reference numeral 1.13, and so forth. The first node of the second supernode 2.2 has the complete reference numeral 1.21; the second node of the second supernode 2.2 has the complete reference numeral 1.22, and so forth.

Each supernode 2 is divided into two subsets, physically indicated by a dot-dash line for the supernode 2.1. In FIG. 1, the first subset of the supernode 2.1, which includes the nodes 1.11, 1.12, 1.13 and 1.14, carries the complete reference numeral 3.11, and the second subset, which includes the nodes 1.15, 1.16, 1.17 and 1.18, carries the complete reference numeral 3.12. The nodes are connected to one another by serial links 4 represented by a heavy solid line, for a double serial link, and a fine solid line for a single serial link. It will be noted that a single serial link in the sense of the present description is conventionally made up of two differential sheathed pairs forming a single logic link and represented for these purposes by a single line in the drawings.

In the invention, the nodes of a subset 3 are connected to one another by double serial links and are connected to the nodes of an adjacent subset of the same supernode 2 by single serial links. Thus the node 1.11 is connected by double serial links to each of the nodes 1.12, 1.13 and 1.14 of the same subset 3.11, and by single links to the nodes 1.15, 1.16, 1.17 and 1.18 of the adjacent subset 3.12 of the same supernode 2.1.

In the preferred embodiment shown, the supernodes 2 are connected in pairs by double serial links associating each node of one supernode with a corresponding node of another supernode. Hence the two supernodes 2.1 and 2.2 are paired, by making a double link between the node 1.11 and the node 1.21, between the node 1.12 and the node 1.22, and so forth. These double links are not indicated in the drawing except for the nodes on the far sides of the schematic representation shown; for the other nodes, they are marked merely by the beginning of a heavy line. In the same way, the supernodes 2.3 and 2.4 are paired by double links that respectively connect the node 1.31 to the node 1.41, the node 1.32 to the node 1.42, and so forth.

In addition, each pair of associated supernodes is connected to another pair of associated supernodes by single serial links connecting each node of one pair to two corresponding nodes of the other pair. Hence the node 1.11 is connected by a single serial link to the node 1.31 and to the node 1.41, and so forth. The node 1.21 is also connected by a single serial link to the node 1.31 and to the node 1.41, and so forth. As above for the double links between two paired supernodes, the single links between two pairs of supernodes have been marked on the drawing only for the nodes at the far sides, with the other single links being marked solely by the beginning of a fine line starting at each node.

In the preferred embodiment shown, the information processing system according to the invention further includes one supernode 5 of input/output devices, carrying the general reference numeral 6, each input/output device 6 being connected by a serial link 4 to a corresponding node of each of the supernodes. Hence in FIG. 1, the input/output devices respectively carry the complete reference numerals 6.1, 6.2, etc. The input/output device 6.1 is connected by single serial links 4 to the nodes 1.11, 1.21, 1.31 and 1.41; the input/output device 6.2 is connected by single serial links 4 to the nodes 1.12, 1.22, 1.32 and 1.42, and so forth, and in the supernode 5, the input/output devices are also connected to one another by a single serial link 7. In the same way as above, the single serial links between the input/output devices have all been shown in the drawing, while the serial links with the processor nodes have been shown only for the nodes at the far sides. It will be noted that for the sake of greater clarity in the drawing, the input/output devices 6 have been grouped in the lower portion of the schematic diagram of FIG. 1, but in reality they will be generally distributed at various levels of the machine that includes the information processing system of the invention.

FIG. 2 schematically shows the structure of one embodiment of a node according to the invention. In this embodiment, each node includes four processors carrying the general reference numeral 8 and a particular reference numeral making it possible to identify it with respect to the node to which it belongs (the first two digits in the particular reference numeral), and by its ordinal number in the node (the last digit in the particular reference numeral). It will be assumed below that FIG. 2 illustrates the structure of the node 1.11, and to identify each of the processors in relation with this node, the processors carry the complete reference numerals 8.111, 8.112, 8.113 and 8.114. By analogy, it will be understood that for the node 1.43, for example, the complete reference numerals of the processors will be 8.431, 8.432, 8.433 and 8.434.

Each processor is associated with a private cache carrying the general reference numeral 9 and with the respective complete reference numerals 9.111, 9.112, 9.113 and 9.114. The term "cache" is known to be conventionally used to designate a memory that contains information which is a copy of information retained in its original form at an address in the general memory of the information processing system, so that a particular instruction processor will be capable of using this information faster than if it had to systematically interrogate the general memory each time it executes an instruction implementing that information. In the sense of the present description, the term "private cache" will be used for a cache to which an instruction processor is connected directly. Each of the private caches 9 is connected to two local buses carrying the general reference numeral 10 and the complete reference numerals 10.111 and 10.112, respectively.

In the sense of the present description, the term "local memory" is used for a memory including a portion of the general memory, that is, a portion of the original information accessible by all the microprocessors. The term "shared cache" is used to designate a memory that contains a copy of information contained in the local memories of other nodes of the information processing system and that is intended to be used by the various processors of the node in which the shared cache is disposed. Conventionally, the private caches, shared caches and local memories include management processors, not shown in the drawing.

When a piece of information necessary for one of the processors is unavailable in the private cache to which the processor is connected, interrogation is done at the level of the local memory of the node, if in conventional fashion it contains that information in its original form, or at the level of the shared cache if that information is conventionally retained in its original form by the local memory of a different node. If information retained conventionally by the local memory of another node is unavailable at the level of the shared cache, the management processor of this shared cache interrogates the local memory of the node that conventionally retains this information in its original form. The private caches, shared caches and local memories may accordingly be considered to be a hierarchy of memories. Each private cache is a memory with a higher level in the hierarchy for a particular node; each shared cache is a second level memory in the hierarchy for the node in question; and each local memory is accordingly a second level memory in the hierarchy for the node in question and a third level memory in the hierarchy for the other nodes.

In the embodiment of FIG. 2, the portion of general memory associated with the node has been subdivided into two local memories: the even local memory 11.111, which contains the information at the even addresses and is associated with the even local bus 10.111, and the odd local memory 11.112, which contains the information retained at the odd addresses and is connected to the odd local bus 10.112. In the same way, the shared cache associated with the node has been divided into an even shared cache 12.111, containing copies of information at even addresses and connected to the even local bus 10.111, and the odd shared cache 12.112 containing copies of information at the odd addresses and connected to the odd local bus 10.112. Each local memory and each shared cache is connected to a network bus 13 assuring a parallel connection, respectively carrying the particular reference numeral 13.111 for the even network bus and 13.112 for the odd network bus.

The network buses are connected to serial link controllers 14 with the complete reference numerals 14.111, 14.112, 14.113 and 14.114, respectively, in the embodiment shown. The serial link controllers 14 assure an interface between the network buses and the serial links 4 that assure the links between the nodes. To that end, the serial link controllers 14 are connected to each of the network buses 13. In the embodiment shown, each node is associated with other nodes, and with the input/output devices, by a total of 15 serial links. The network buses could be connected to serial links by an interface including only a single serial link controller. However, for technological reasons, the power consumed would be too great and would cause unacceptable heating of this interface. This is why the interface between the network buses and the serial links has been subdivided into four serial link controllers. The number of serial link controllers used, it is understood, depends on the number of serial links that must be connected to one node, but also on the number of sockets that it is acceptable to dispose on the network buses to assure the linkage between these network buses and the serial link controllers. In the embodiment shown, it will be noted that each parallel-type bus, whether a local bus or a network bus, has six units connected to it, which makes it possible to assure a sufficiently high message rate without unduly increasing the complexity of the transmission protocols for these messages.

Figure 4:
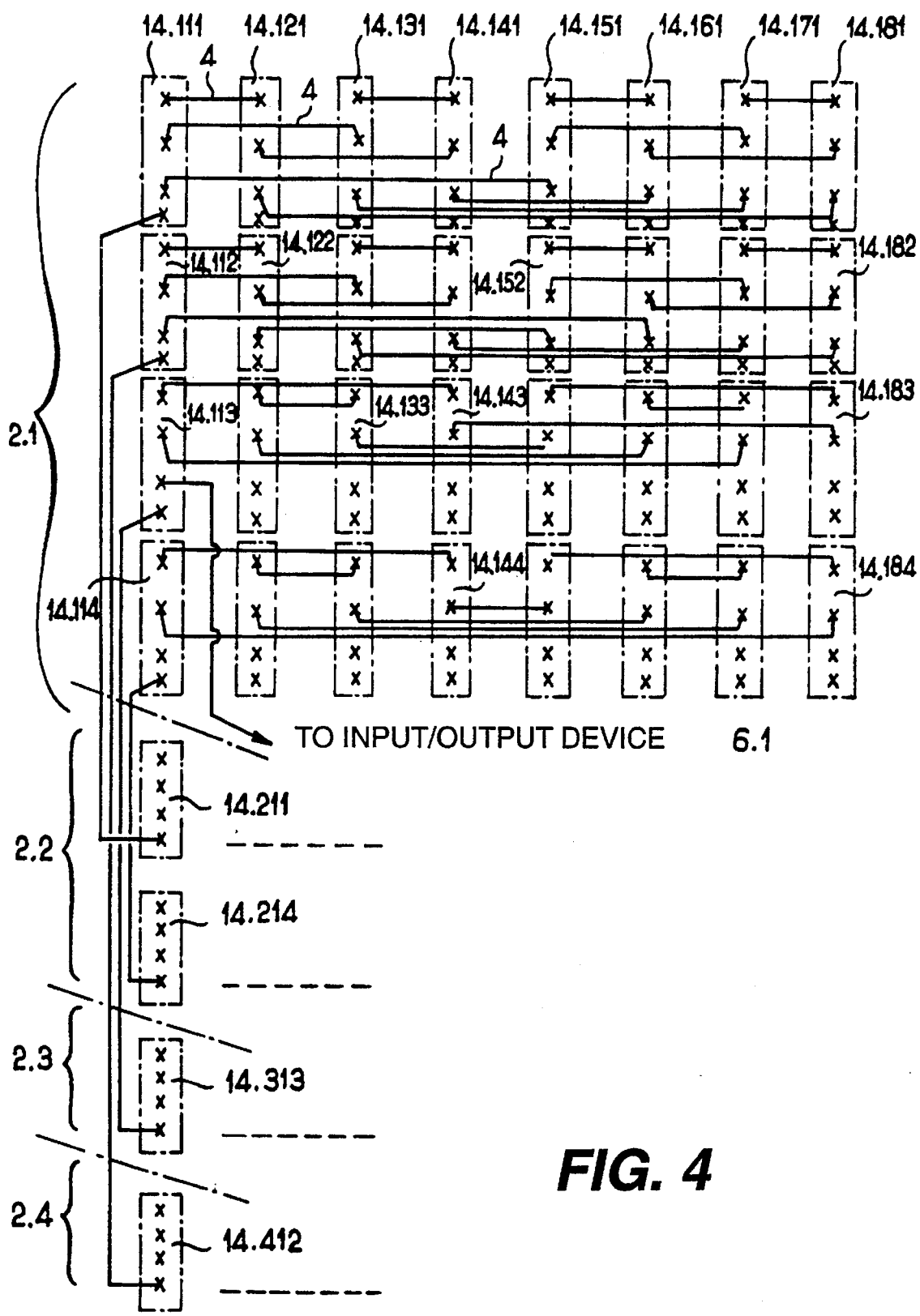
FIG. 4 is a fragmentary schematic illustration of the connections among the serial links in a supernode and with one node of other supernodes of the system.

FIG. 4 shows the distribution of the serial links among the serial link controllers of the same supernode and with the serial link controllers of the other supernodes with which a supernode is associated. The lines between the serial link controllers and the network buses have not been shown. To simplify the drawing, in FIG. 4 only the distribution of serial links between the serial link controllers of the first supernode 2.1 has been shown, and for the links with the other supernodes, only the distribution of the serial links between the node 1.11 and the corresponding serial link controllers of the other supernodes has been shown.

In this drawing figure, each serial link controller is represented by a rectangle drawn in dot-dashed lines, and the connections of a serial link 4 with a serial link controller are represented by a solid line for each single serial link. With reference to the numbering system adopted above, the first serial link controller of the node 1.11 has the complete reference numeral 14.111, while the first serial link controller of the node 1.12 has the complete reference number 14.121, and so forth. The second serial link controller of node 1.11 has the complete reference numeral 14.112, the second serial link controller of node 1.12 has the complete reference numeral 14.122, and so forth.

By way of example, the double serial link connecting the node 1.11 to the node 1.12 is shown as one single serial link connecting the serial link controller 14.111 and the serial link controller 14.121 and one single serial link connecting the serial link controller 14.112 and the serial link controller 14.122; the double serial link connecting the node 1.11 to the node 1.14 is shown as one single link connecting the serial link controller 14.113 to the serial link controller 14.143 and one single serial link connecting the serial link controller 14.114 to the serial link controller 14.144; the double serial link connecting the node 1.11 to the node 1.21 is shown as one single serial link connecting the serial link controller 14.111 and the serial link controller 14.211 and one single serial link connecting the serial link controller 14.114 and the serial link controller 14.214; the single serial link connecting the node 1.11 to the node 1.31 is represented by the single serial link connecting the serial link controller 14.113 to the serial link controller 14.313, and the single serial link connecting the node 1.11 to the node 1.41 is shown as the single serial link connecting the serial link controller 14.112 to the serial link controller 14.412.

The serial link controller 14.113 further includes a terminal connected to the serial link controller of the input/output device 6.1; this terminal has not been shown in the drawing. The serial link controller 14.114 includes an unassigned terminal, which as applicable can be used to assure a double serial link between the node 1.11 and the input/output device 6.1.

It will be noted that the links thus made make it possible to proceed from any one node to any other node by using only two serial links. By way of example, one proceeds from the node 1.1 to the node 1.33 by using first one of the serial links from node 1.11 to node 1.13 and then the serial link connecting node 1.13 to node 1.33. In the same way, one proceeds from node 1.35 to node 1.22 by using the serial link from node 1.35 to node 1.32 and then the serial link from node 1.32 to node 1.22. Taking into account the multiconnection relationship of the supernode 5 with input/output devices, this property is also obtained for the link of any of the input/output devices with any of the nodes. It will be noted on this point that an input/output device is not conventionally intended to function with all the nodes, and one can accordingly economize on links by omitting those connecting the input/output devices to one another.

It will be noted in this respect that to simplify the message routing protocols, it is preferable to systematically use the same type of combination of routes, for instance a serial link inside a supernode with a serial link between supernodes. In this respect, it will also be noted that when two serial links that must be used successively are not connected to the same serial link controller, the message transmitted travels over the network bus of the intermediate node. In the first example given above, a message will then pass successively, in the serial link connecting the serial link controllers 14.111 and 14.131, over the network bus of the node 1.13 in order to go from the serial link controller 14.131 to the serial link controller 14.133 and then from the serial link controller 14.133 to the serial link controller 14.333 of the node 1.33.

Figure 3:
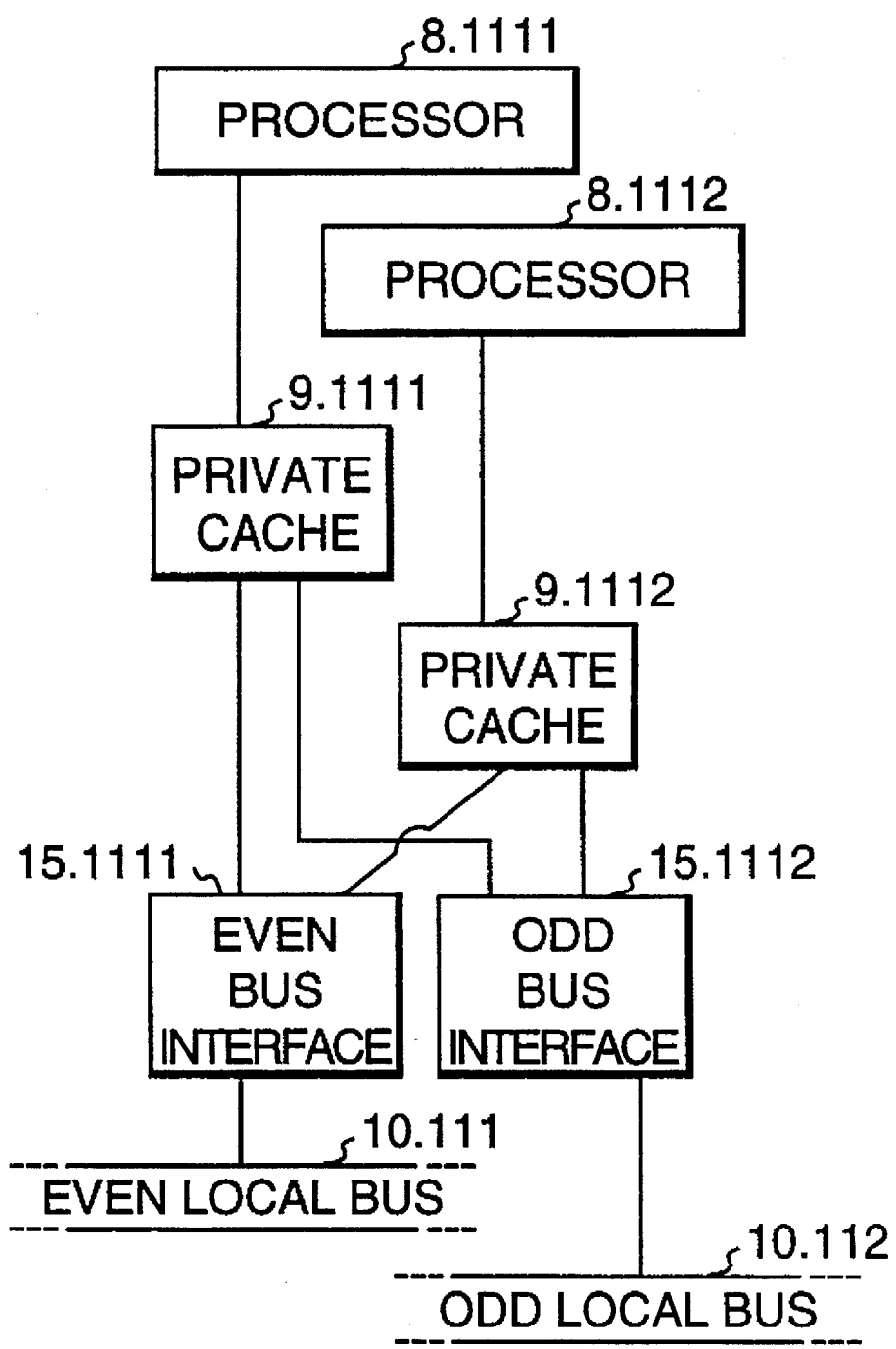
FIG. 3 illustrates a variant embodiment of the structure of the node of FIG. 2.

FIG. 3 in fragmentary fashion shows a variant embodiment of the node shown in FIG. 2 that makes it possible to multiply by two the number of processors of the node, without increasing the number of outlets on the local buses and without moreover changing the links between the nodes. In this variant embodiment, each of the processors and the private cache associated with each processor is replaced by two processors, each associated with one private cache. FIG. 3 illustrates the doubling of the processor 8.111 of FIG. 2; it is understood that an identical doubling is done for the other processors of the same node so as not to complicate message management with the node unduly. The processor 8.111 is then replaced by one processor 8.1111 and one processor 8.1112, respectively connected to a private cache 9.1111 and a private cache 9.1112. Each private cache is connected to two interfaces 15 for the linkage with the local buses: one even bus interface 15.1111, which is connected to the even local bus 10.111, and one odd bus interface 15.1112, which is connected to the odd local bus 10.112.

Figure 5:
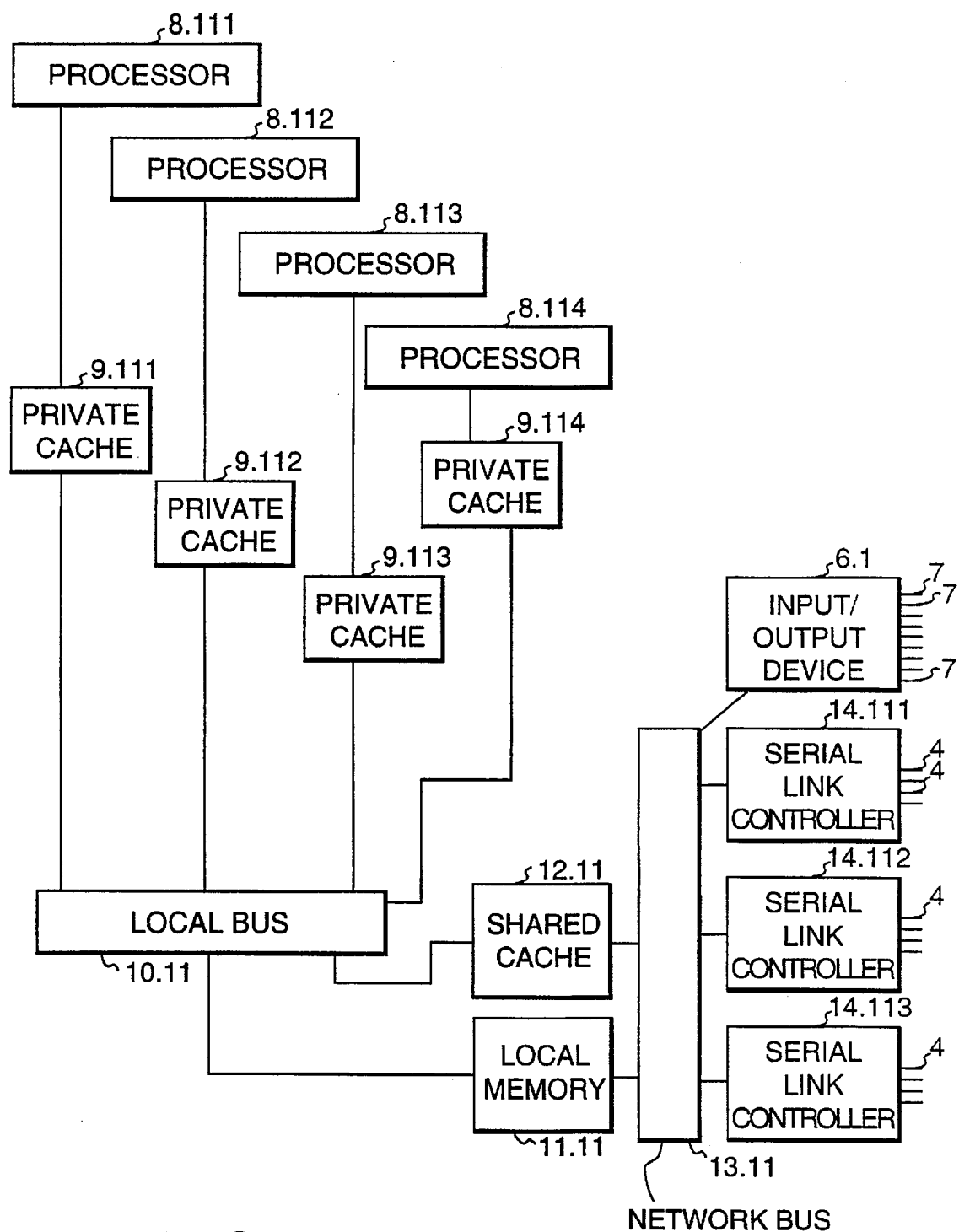
FIG. 5 schematically shows an exemplary structure of a node in the case of a configuration less than the maximum configuration.

In connection with FIG. 2, it will be noted that doubling of the local buses and network buses into two buses, one associated with the even addresses and the other associated with the odd addresses, makes it possible to lessen the latency of relations with the local memory and the shared cache, without increasing the number of outlets at the level of each parallel-type bus. When the power of the processors installed in each node, or the degree of sharing of information among the nodes, does not justify such a sophisticated system, then the system according to the invention may be achieved by providing a single local bus and a single network bus in each node, these buses being associated with a single local memory and a single shared cache, as shown in FIG. 5. In that embodiment, the node as before includes four processors 8.111, 8.112, 8.113 and 8.114, connected respectively to the private caches 9.111, 9.112, 9.113 and 9.114, which are associated with a single local bus 10.11, which in turn is connected to a single local memory 11.11 and a single shared cache 12.11. The local memory and the shared cache are connected to a single network bus 13.11. It will be noted that in this configuration, the local bus as before serves only to transmit messages necessary for the processors of the node in order to sample the information contained in the local memory or the copies of information contained in the shared cache, while the network bus serves to transmit messages intended for updating information of the local memory or the shared cache, or for putting into the shared cache the copies, requested by this shared cache, of information contained in the local memories of other nodes, or sampling, in the local memory of the node, information requested by the shared caches of other nodes.

It will also be noted that the embodiment shown in FIG. 5 corresponds to a configuration less than the maximal configuration, that is, a configuration including a number of nodes less than the number of nodes shown in FIG. 1, so that the number of serial links has been made twelve, and the number of serial link controllers has been made three. Under these conditions, the number of network bus outlets used by the local memory, the shared cache and the serial link controllers is only 5, so that it is then possible to connect the input/output device 6.1 directly to the local bus 13.11. In that case, the serial link controller of the input/output device 6.1 (not shown in this drawing figure) serves solely to assure management of the messages over the serial links 7 connecting the input/output devices to one another.

Figure 6:
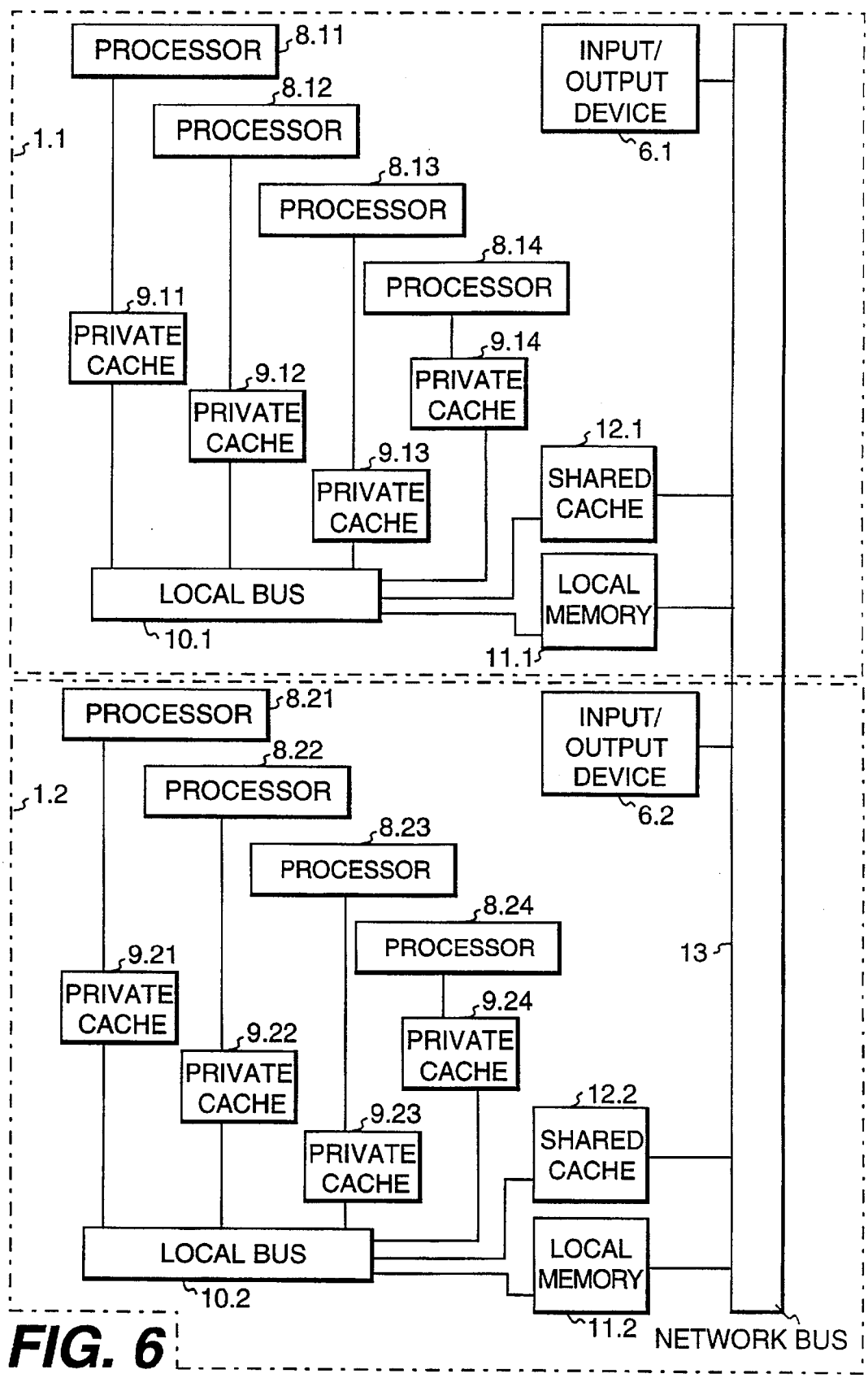
FIG. 6 schematically shows the structure of the information processing system in the case of a configuration including only two nodes.

FIG. 6 illustrates an even simpler configuration, including only two nodes 1.1 and 1.2, physically represented by boxes in dot-dashes lines in this drawing figure. As before, each node includes four processors, with respective reference numerals 8.11, 8.12, 8.13 and 8.14 for the node 1.1; and 8.21, 8.22, 8.23 and 8.24 for the node 1.2. The processors are connected respectively to the private caches 9.12, 9.12 . . . and 9.21, 9.22, in turn are connected to two local buses, 10.1 and 10.2, respectively. The local buses are each connected to one local memory, 11.1 and 11.12, respectively, and one shared cache 12.1 and 12.2, respectively. In this configuration, each node also includes an input/output device, 6.1 and 6.2, respectively. It can be seen that instead of providing one network bus in each node and serial links between the nodes, it is then more advantageous to provide one common network bus 13, which is equipped with six outlets, as in the preceding examples.

It is understood that the invention is not limited to the embodiments described, and variant embodiments may be made without departing from the scope of the invention as defined by the claims.

In particular, it will be noted that the number of nodes or the number of supernodes is not determined in any critical way, and the general structure of the information processing system according to the invention, or the structure of the nodes, may advantageously be adapted, depending on the configurations to be made that one will preferably seek to balance by using the novel structural aspects of the invention. By way of example, for an information processing system having an open-ended configuration of from one to eight processors, the structure described in conjunction with FIG. 6 will preferably be used, by reducing it to a single node for a configuration ranging from one to four processors. For an information processing system with an open-ended configuration including from 4 to 32 processors, a structure will preferably be realized that reproduces the structure of a supernode according to the invention. For an open-ended configuration including from 8 to 64 processors, a structure will preferably be realized including two supernodes, and for a configuration including from 16 to 128 processors, these processors will preferably be distributed among four supernodes, with the serial links corresponding to the maximum configuration preferably being installed in the basic structure of the machine so as to enable easy modification of the configuration, in particular to make a modification of the connection of the links in the event that one serial link fails, or to change the configuration, either to increase or decrease the number of microprocessors, without requiring modification of the interconnections.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

We claim:

1. An information processing system with shared memory means, the system comprising processors grouped in sets of nodes that have a critical size relative to a rate of messages between said processors and said shared memory means, and interconnecting means including double serial links for connecting the nodes in each of said sets of nodes to transmit said messages and single serial links for connecting the nodes of one set of nodes with nodes of other sets of nodes to transmit said messages.

2. The system of claim 1, wherein at least a portion of said nodes are further connected to input/output means through respective single serial links.

3. The system of claim 2, wherein said input/output means are connected to one another through respective single serial links.

4. An information processing system with shared memory means, the system having an open-ended configuration from a first configuration to a maximum configuration and comprising in the maximum configuration a predetermined number of processors grouped in sets of nodes that have a critical size relative a rate of messages between said processors and said shared memory means and in the first configuration a portion of said maximum number of processors grouped in at least one set of nodes, and means for interconnecting said nodes of said first configuration with one another, said interconnecting means including serial link controller means having a predetermined number of terminal means in each node, double serial links for connecting the nodes to one another in each set to transmit said messages at respective ones of said terminal means of the nodes and, when said first configuration has at least two sets of nodes, single serial links for connecting the nodes of one set with nodes of the other sets to transmit said messages at respective ones of said terminal means, and said predetermined number of terminal means in each node being determined to further allow connection between said nodes of the first configuration and each of other ones of said nodes of said maximum configuration.

5. The system of claim 4, wherein said nodes are further connected to input/output means through respective single serial links and terminal means.

6. The system of claim 4, wherein said serial link controller means is made up of serial link controllers interconnected with one another through a bus in the corresponding node.

7. An information processing system with shared memory means, the system comprising processors grouped in sets of nodes that have a critical size relative to a rate of messages between said processors and said shared memory means, a pair of sets forming a supernode, and interconnecting means including double serial links for connecting the nodes in each set to transmit said messages and single serial links in each supernode for connecting each node of one set to the nodes of the other set to transmit said messages.

8. The system of claim 7, wherein said interconnecting means further includes single serial links for connecting a node of a supernode to a node of another supernode.

9. The system of claim 7, wherein two of said supernodes are connected in a pair in which each node of one supernode is connected to a node of the other supernode to form a pair of corresponding nodes and said interconnecting means further includes double serial links for connecting said pairs of corresponding nodes, respectively.

10. The system of claim 9, wherein said pairs of corresponding nodes in one pair of supernodes correspond to said pairs of corresponding nodes in another pair of supernodes and said interconnecting means further includes single serial links for connecting each node of each of said pairs of corresponding nodes in said one pair of supernodes to the two nodes of said pair of corresponding nodes of said another pair of supernodes.

11. The system of claim 7, wherein said nodes have respective positions in one of said supernodes and corresponding positions with said nodes of another one of said supernodes and said message exchange between one node of said one supernode and another node of said another supernode is made via the node in said one node which corresponds to said another node.

12. The system of claim 7, wherein said serial link controller means is made up of serial link controllers interconnected with one another through a bus in the corresponding node.

13. The system of claim 7, wherein said nodes are further connected to input/output means through respective single serial links.

14. The system of claim 13, wherein said input/output means are connected to one another through respective single serial links.

15. An information processing system with shared memory means, the system having an open-ended configuration from a first configuration to a maximum configuration and comprising in the maximum configuration a predetermined number of processors grouped in sets of nodes that have a critical size relative a rate of messages between said processors and said shared memory means and in the first configuration a portion of said maximum number of processors grouped in at least two sets of nodes, a pair of sets forming a supernode, and means for interconnecting said nodes of said first configuration with one another, said interconnecting means including serial link controller means having a predetermined number of terminal means in each node, double serial links for connecting the nodes to one another in each set to transmit said messages at respective ones of said terminal means of the nodes and single serial links in each supernode for connecting each node of one set to the nodes of the other set to transmit said messages at respective ones of said terminal means, and said predetermined number of terminal means in each node being determined to further allow connections between said nodes of the first configuration and each of other ones of said nodes of said maximum configuration.

16. The system of claim 15, wherein said interconnecting means further includes single serial links for connecting a node of a supernode to a node of another supernode at respective ones of said terminal means.

17. The system of claim 15, wherein two of said supernodes are connected in a pair in which each node of one supernode is connected to a node of the other supernode to form a pair of corresponding nodes and the interconnecting means further includes double serial links for connecting said pairs of corresponding nodes, respectively, at respective ones of said terminal means.

18. The system of claim 17, wherein said pairs of corresponding nodes in one pair of supernodes correspond to said pairs of corresponding nodes in another pair of supernodes, respectively, and said interconnecting means further includes single serial links for connecting each node of each of said pairs of corresponding nodes in said one pair of supernodes to the two nodes of said pair of corresponding nodes of said another pair of supernodes at respective ones of said terminal means.

19. The system of claim 15, wherein said nodes have respective positions in one of said supernodes and corresponding positions with said nodes of another one of said supernodes and said message exchange between one node of said one supernode and another node of said another supernode is made via the node in said one node which corresponds to said another node.

20. The system of claim 15, wherein said serial link controller means is made up of serial link controllers interconnected with one another through a bus in the corresponding node.

21. The system of claim 15, wherein at least a portion of said nodes are further connected to input/output means through respective single serial links at respective ones of said terminal means.

22. The system of claim 21, wherein said input/output means are connected to one another through respective single serial links.

* * * * *